(12) United States Patent
Mohseni

(10) Patent No.: US 9,211,595 B2
(45) Date of Patent: Dec. 15, 2015

(54) INDEXABLE CUTTING INSERT AND A TOOL FOR CHIP REMOVING MACHINING, AS WELL AS A BASIC BODY FOR THE TOOL

(71) Applicant: SANDVIK INTELLECTUAL PROPERTY AB, Sandviken (SE)

(72) Inventor: Mojgan Mohseni, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 298 days.

(21) Appl. No.: 13/868,164

(22) Filed: Apr. 23, 2013

(65) Prior Publication Data

US 2013/0279996 A1   Oct. 24, 2013

(30) Foreign Application Priority Data

Apr. 24, 2012   (SE) ...................................... 1250411

(51) Int. Cl.
*B23B 27/16* (2006.01)
*B23C 5/20* (2006.01)
*B23C 5/22* (2006.01)
*B23B 27/14* (2006.01)

(52) U.S. Cl.
CPC . *B23C 5/20* (2013.01); *B23B 27/14* (2013.01); *B23B 27/16* (2013.01); *B23C 5/22* (2013.01); *B23B 2200/048* (2013.01); *B23B 2200/0423* (2013.01); *B23B 2200/087* (2013.01); *Y10T 407/22* (2015.01); *Y10T 407/2272* (2015.01); *Y10T 407/23* (2015.01)

(58) Field of Classification Search
CPC ............ Y10T 407/23; Y10T 407/2272; Y10T 407/2282; Y10T 407/1924; B23B 27/16; B23B 27/1611; B23B 2200/0423; B23B 2200/048

See application file for complete search history.

(56) References Cited

U.S. PATENT DOCUMENTS

| 349,475 | A | * | 9/1886 | Barclay | 407/64 |
|---|---|---|---|---|---|
| 632,678 | A | * | 9/1899 | Dock | 407/64 |
| 1,365,683 | A | * | 1/1921 | Griffith | 29/35.5 |
| 1,415,339 | A | * | 5/1922 | Hall | 407/24 |
| 1,875,967 | A |  | 9/1932 | Weddell |  |
| 5,004,379 | A | * | 4/1991 | Little | 407/113 |
| 2001/0026736 | A1 | * | 10/2001 | Lynde | 407/114 |

(Continued)

FOREIGN PATENT DOCUMENTS

DE   1234485 B   2/1967
FR   1099534 A * 11/1955 ............. B23B 27/16

(Continued)

*Primary Examiner* — Sunil K Singh
*Assistant Examiner* — Ryan Rufo
(74) *Attorney, Agent, or Firm* — Corinne R. Gorski

(57) ABSTRACT

An indexable cutting insert for chip removing machining includes a plurality of cutting tips that protrude from a central core. Each of the individual tips include a cutting edge, which is formed in a transition between an upper side serving as chip surface and a clearance surface, which extends between the upper side and an under side. The cutting insert has six equally long cutting tips that are located in pairs along the co-ordinate axes of a three-dimensional, orthogonal system of co-ordinates, the origin of which is situated in the core. By arranging the cutting tips in this way, the inactive cutting tips, which are situated behind an active cutting tip, can be contained within a limited volume and therefore be installed in tool basic bodies having tapering parts. A tool equipped with the cutting insert according to the invention, as well as, a tool basic body is disclosed.

18 Claims, 15 Drawing Sheets

(56) References Cited

U.S. PATENT DOCUMENTS

Figure 1:
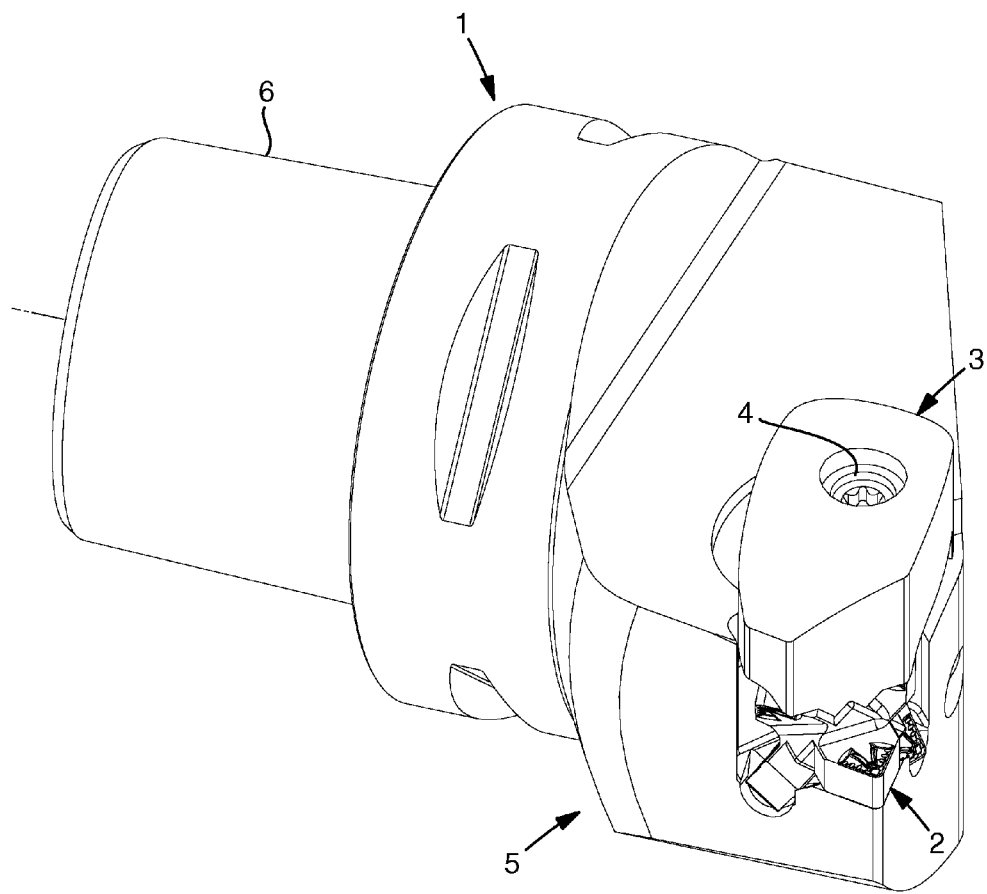

| | | | |
|---|---|---|---|
| 2003/0156910 A1* | 8/2003 | Friedman et al. | 407/117 |
| 2003/0223830 A1* | 12/2003 | Bryan et al. | 407/119 |
| 2004/0253063 A1* | 12/2004 | Murrell | 407/113 |
| 2010/0150672 A1* | 6/2010 | Edler | 407/120 |
| 2012/0315098 A1* | 12/2012 | Tamez et al. | 407/114 |
| 2013/0287506 A1* | 10/2013 | Morgulis et al. | 407/103 |

FOREIGN PATENT DOCUMENTS

| | | | | |
|---|---|---|---|---|
| GB | 933770 B | 8/1963 | | |
| GB | 2092486 A | 8/1982 | | |
| GB | 2333728 A | 8/1999 | | |
| SU | 1313571 A1 * | 5/1987 | | B23B 27/145 |
| WO | 2011106678 A1 | 9/2011 | | |

* cited by examiner

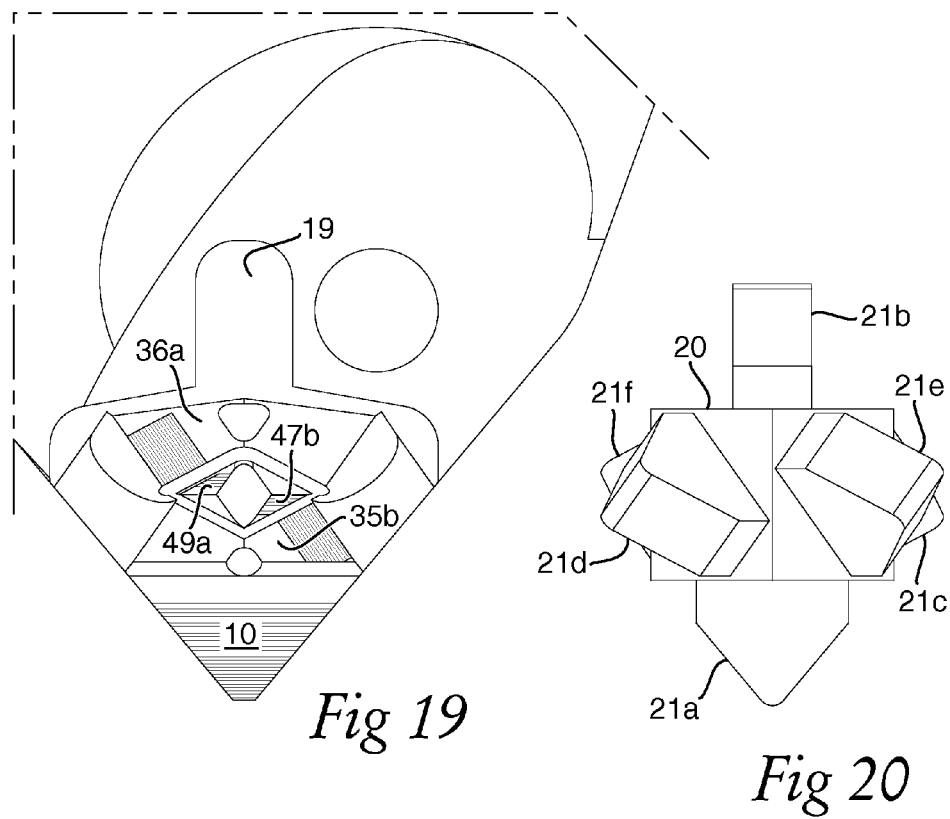
Fig 19
Fig 20
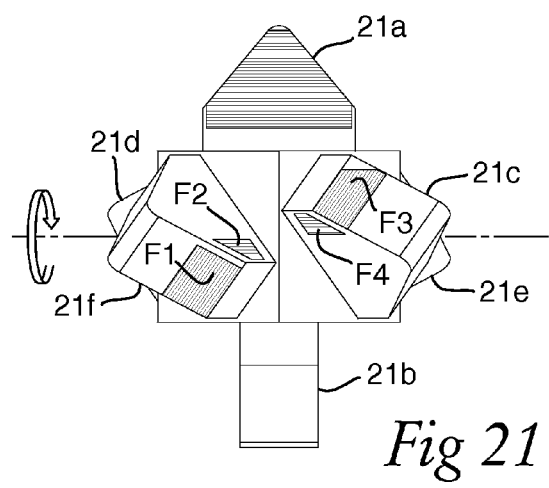
Fig 21

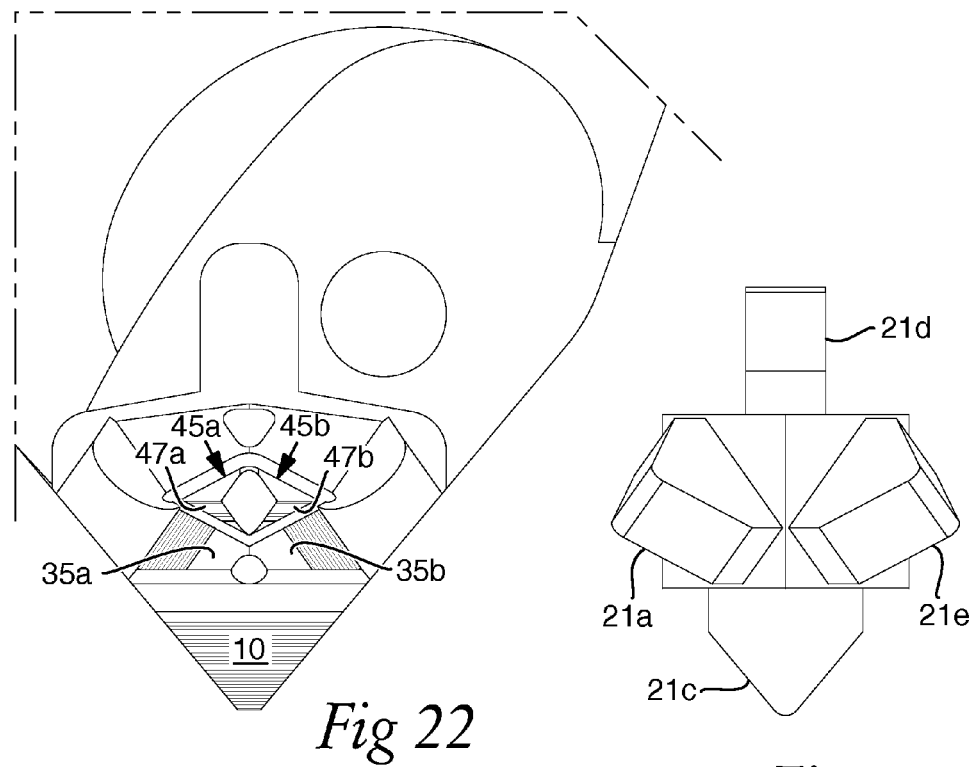
Fig 22
Fig 23
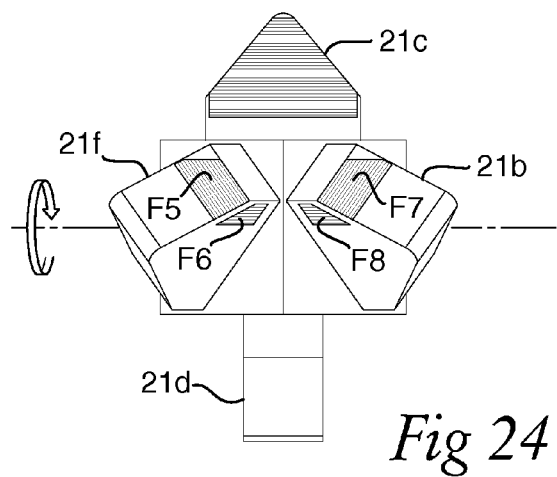
Fig 24

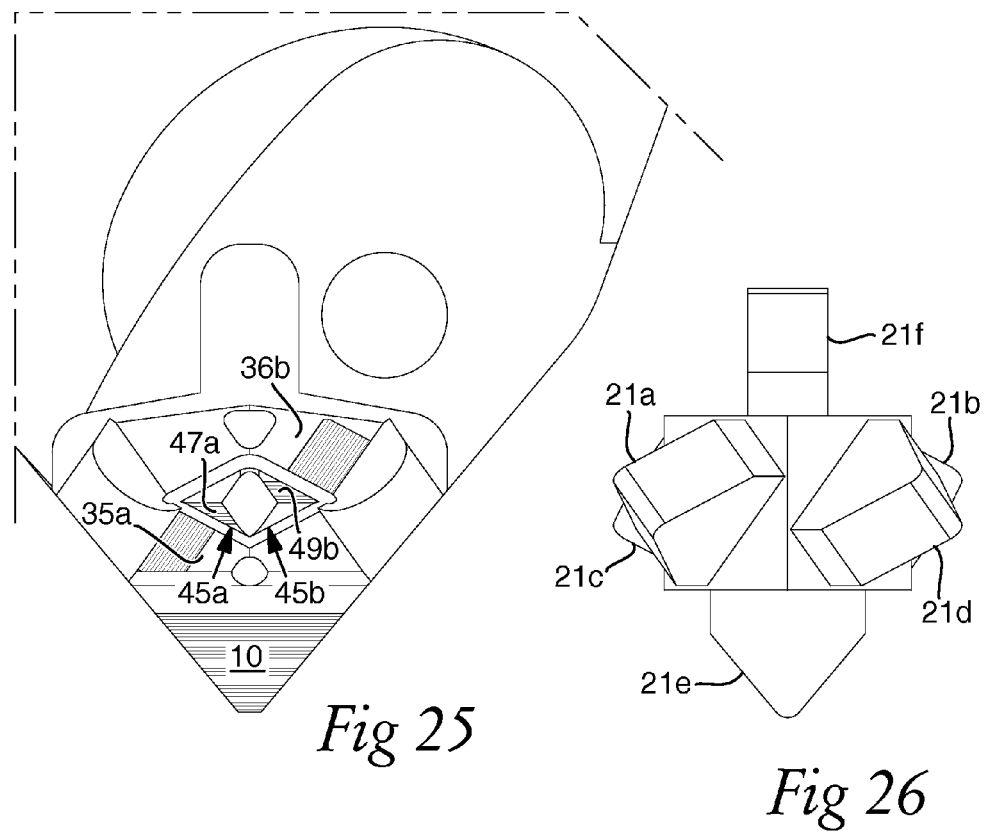
Fig 25
Fig 26
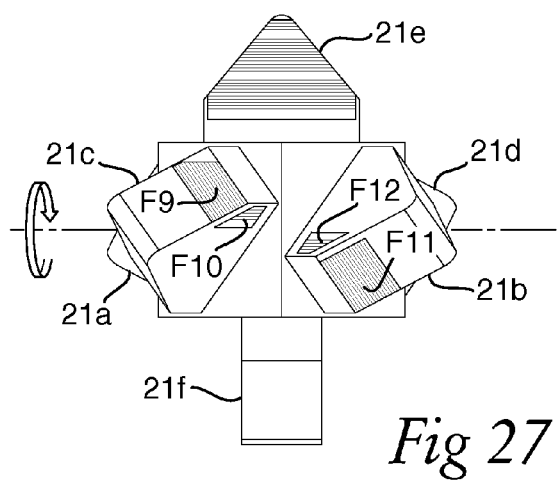
Fig 27

INDEXABLE CUTTING INSERT AND A TOOL FOR CHIP REMOVING MACHINING, AS WELL AS A BASIC BODY FOR THE TOOL

RELATED APPLICATION DATA

This application claims priority under 35 U.S.C. §119 to Swedish Patent Application No. 1250411-4, filed on Apr. 24, 2012, which the entirety thereof is incorporated herein by reference.

TECHNICAL FIELD OF THE INVENTION

In a first, vital aspect, this invention relates to an indexable cutting insert intended for chip removing machining and of the type that comprises a plurality of cutting tips that protrude from a central core and individually include a cutting edge, which is formed in a transition between an upper side serving as chip surface, and a clearance surface, which extends between the upper side and an under side.

In a second aspect, the invention also relates to an assembled tool, which comprises on one hand a basic body having a seat situated in an area between two limiting surfaces of the basic body converging toward each other and delimited by a wall and a bottom, and, on the other hand, a cutting insert formed in accordance with the invention, a tightening device being arranged to press contact surfaces of the cutting insert against support surfaces in the bottom of the seat.

In a third aspect, the invention also relates to a tool basic body as such.

BACKGROUND OF THE INVENTION AND PRIOR ART

Chip removing or cutting tools of the type generally mentioned above are used for the machining of workpieces of metal and other non-fibrous materials, such as composites. The basic bodies of the tools are usually manufactured from steel, while the replaceable cutting inserts are manufactured from cemented carbide or other materials having greater hardness and resistance to wear than steel.

Partly as a consequence of cemented carbide being a comparatively costly material, there is among tool manufacturers an aim to construct the cutting inserts with as many cutting edges as possible per unit volume of cemented carbide. This has resulted in so-called double-sided cutting inserts and cutting inserts having multiple cutting tips, respectively, each of which may be double-sided, i.e., have cutting edges along an upper side as well as an under side. Examples of the last-mentioned type of cutting inserts are disclosed in US 20100329800 and SE 533249, the first-mentioned document of which describes a cutting insert intended for turning having three alternately usable, double-sided cutting tips, and the last-mentioned a cutting insert intended for milling having not less than eight, double-sided cutting tips.

A disadvantage or limitation of previously known cutting inserts having a plurality of cutting tips and many cutting edges, is, however, that all cutting tips are located in one and the same plane, indexing of the cutting insert being carried out by step-wise turning forward the cutting tips in said plane. This means that the cutting inserts cannot be used for certain types of machining operations, e.g., turning of shoulder or shoulder milling. Thus, the cutting insert according to SE 533249 is formed with a disc-shaped or pulley-like core, along the periphery of which eight diminutive, double-sided cutting tips are located at a pitch of 45°. It is true that this design allows face milling (at moderate cutting depths), but not shoulder milling, which requires that the cutting insert as well as a behind part of the tool basic body is contained within a sector or corner angle of at most 90°.

The turning insert according to US 20100329800 includes three double-sided cutting tips that protrude radially from a hub-like, central core. Because a sector, which is defined by the angle between the nose edge of an individual cutting tip and the nose edges of the two other cutting tips, amounts to 60°, this cutting insert may very well be used for turning of shoulder. However, then, the number of cutting tips is limited to exactly three, i.e., to in total 3×2=6 usable cutting edges. Each hypothetical attempt to further increase the number of cutting edges by providing the cutting insert with additional cutting tips in one and the same plane would, however, entail an increase of the sector angle to 90°, and thereby make impossible the use of the cutting insert for turning of shoulder.

Objects and Features of the Invention

The present invention aims at obviating the above-mentioned, geometrically conditioned limitations of previously known, indexable cutting inserts having multiple cutting tips and cutting edges, and at providing an improved cutting insert. Therefore, a primary object of the invention is to provide an indexable cutting insert having considerably more cutting tips and usable cutting edges than what previously has been considered to be possible, at the same time as the cutting insert should be so compact or space-efficient that the same can be installed in a tool basic body that is suitable for shoulder turning and shoulder milling, respectively, or other machining operations that require that a part of the tool basic body is contained within an angle of 90°. A further object is to provide a cutting insert, by means of which the generation of heat in the cutting zone can be reduced and thereby counteract heat-conditioned damage to the active cutting edge. It is also an object to provide a cutting insert, the inactive cutting edges of which are well protected during the chip removal of the active cutting edge. In such a way, it is guaranteed that the unused cutting edges retain their micro geometry until the same are indexed up into an active position. Still another object is to provide a cutting insert having so many usable cutting edges that the manufacturing cost for the individual cutting edge in relation to the total volume of the cutting insert becomes minimal. In other words, the machining cost for the user, in relation to the amount of cemented carbide included in the cutting insert, should be minimized.

According to the invention, at least the primary object is attained by the cutting insert being formed with six equally long cutting tips that are located in pairs along the co-ordinate axes of a three-dimensional, orthogonal system of co-ordinates, the origin of which is situated in the core of the cutting insert, the position of the individual cutting tip in relation to the position of the other cutting tips being defined by a reference plane that is parallel to the under side of the cutting tip and with which one co-ordinate axis coincides. By in this way arranging as many as six cutting tips in different directions in space instead of in a common plane, the cutting insert can in a surprising way be installed in also fairly pointed nose portions of a tool basic body.

In one embodiment, first and second, diametrically opposed cutting tips, along a common, first co-ordinate axis, are oriented with their reference planes perpendicular to each other, the two other co-ordinate axes intersecting an imaginary extension of the reference plane of the individual, first or second cutting tip at an angle of 45°. In such a way, the cutting tips can be formed with a width that guarantees on one hand that the same become strong, and on the other hand that the active cutting tip obtains a large bearing surface and thereby a stable support on a main support surface included in the seat of the tool body. In addition, the inactive cutting tip, which is diametrically opposite the active cutting tip, can be housed in a comparatively narrow cavity in the tool body.

In a further embodiment, the individual cutting tip comprises on one hand an outer part, in which the cutting edge is included, and on the other hand an inner part that is positioned closest to the core and has a quadrangular cross-sectional shape. By in this way forming the individual cutting tip with an outer part as well as an inner part located between the same and the core, the active cutting edge can be located at a certain distance from the core, whereby the core and the inactive cutting tips can be housed a good distance into the seat of the basic body. Furthermore, by the quadrangular cross-sectional shape of the inner part of the cutting tip, surfaces, which meet each other at a right angle, can in an advantageous way be utilized for engaging and be supported in V-shaped chutes in the seat of the basic body.

In yet an embodiment of the invention, the individual cutting edge is V-105 shaped by including two main edges that converge toward a common nose edge, more precisely at an acute angle of convergence. In such a way, the cutting insert can in an advantageous way be utilized for turning purposes, more precisely for shoulder turning as well as profile turning (external and internal), right-hand turning as well as left-hand turning operations being possible because any of the two main edges on both sides of the nose edge can remove chips.

In another embodiment, the individual cutting tip is double-sided so far that the upper and under sides consist of identical chip surfaces that individually transform into a common clearance surface via a cutting edge. In this way, one and the same cutting insert can be formed with no less than 12 usable cutting edges (and thereby 24 main edges).

In yet an embodiment, the inner part of the cutting tip has a rectangular cross-sectional shape. In such a way, the individual cutting tip obtains an optimum width and an optimum bearing surface for abutment against a main support surface in the seat of the tool body. In addition, the active main edges can be given a large edge length adjacent to possible chipformers, which is something that in turn allows large cutting depths.

In a further embodiment, the core of the cutting insert is cubical and includes six quadratic limiting surfaces, from which the cutting tips protrude. In such a way, the core obtains cross-sectionally perpendicular edge portions, against which a tightening device can be applied with high accuracy. Such an edge portion for the application of the tightening device will always assume one and the same spatial position in the seat irrespective of the indexing state of the cutting insert.

In another embodiment, the individual cutting tip is located with its reference plane running between two diagonally opposite corners along the individual limiting surface of the cubical core. Also this embodiment contributes to optimizing the width and strength of the cutting tip.

TERMINOLOGY

In the following description of the invention, concepts will be used that deserve to be made clear already here.

a) "Upper and under sides" of a cutting tip relate to the state in which the cutting insert is mounted in a seat in the basic body. The cutting tip is then pressed with its under side against a main support surface included in a bottom in the seat, while the upper side is a chip surface, along the periphery of which an active cutting edge borders on a clearance surface. If the individual cutting tip is single sided and includes only one cutting edge, only one chip surface is present that always faces upward in the seat, i.e., forms an upper side. However, if the cutting tip is double-sided, i.e., includes two cutting edges adjacent to two opposite, identical chip surfaces, the individual chip surface may be either an upper side or an under side of the mounted cutting insert, all depending on the present indexing state thereof.

b) A "reference plane" for the individual cutting tip is a plane that is parallel to the under side and in which a co-ordinate axis of the cutting tip is located. If the cutting tip is double-sided, said reference plane also forms a neutral plane situated halfway between the upper and under sides (and is oriented parallel to the same).

c) The concept "symmetry plane" is used in connection with the definition of the bottom of the seat as well as of the geometry of the individual cutting tip.

BRIEF DESCRIPTION OF THE APPENDED DRAWINGS

Figure 2:
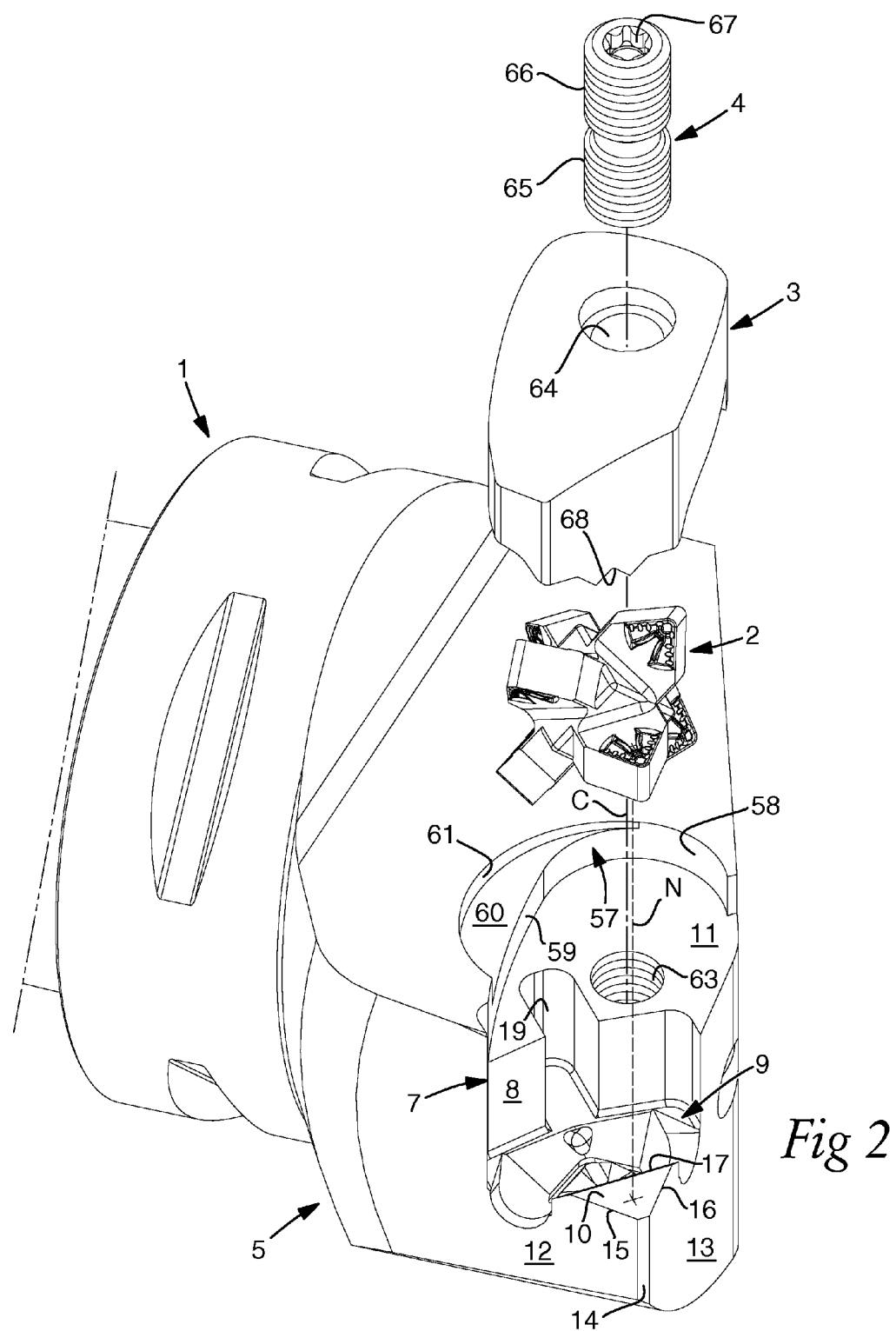
Figure 3:
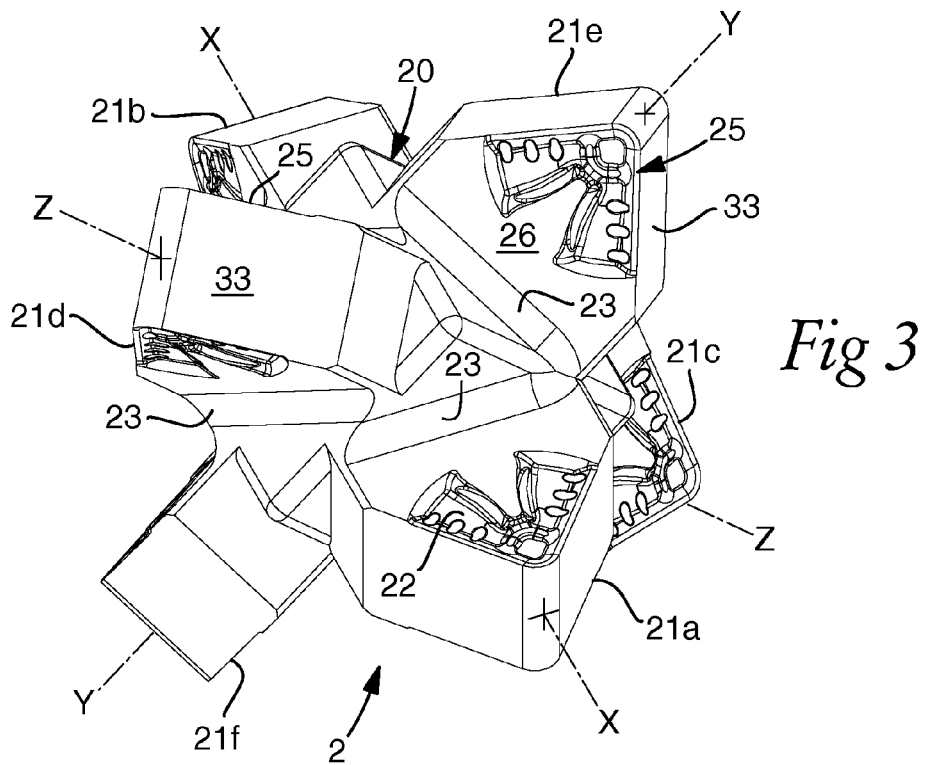
Figure 4:
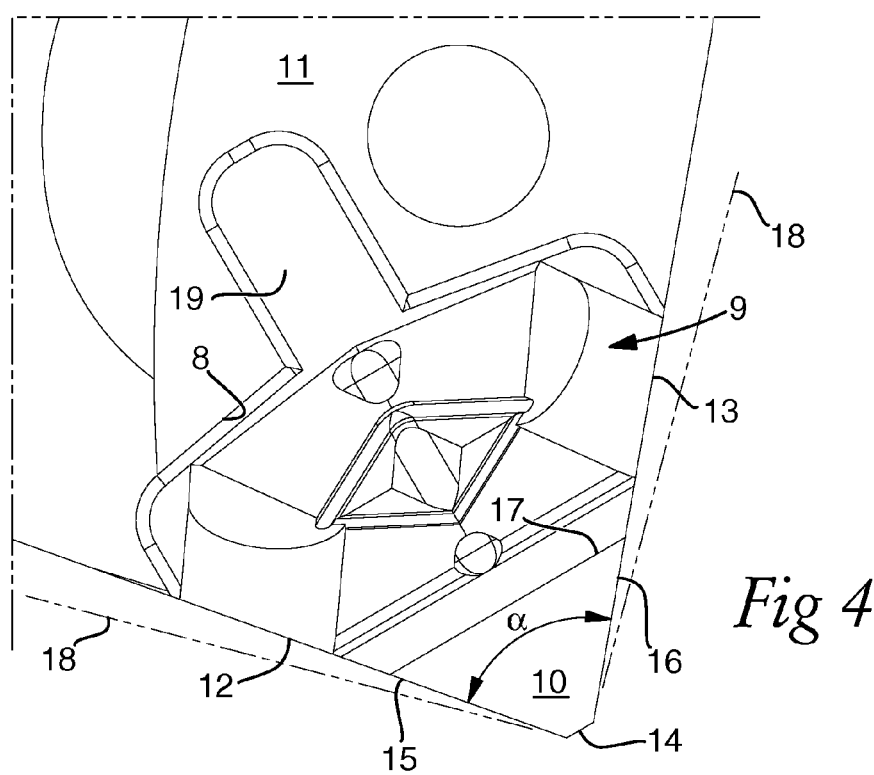
Figure 5:
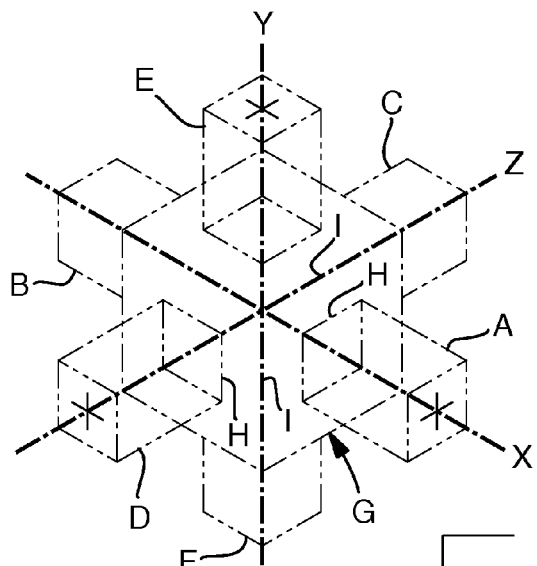
Figure 6:
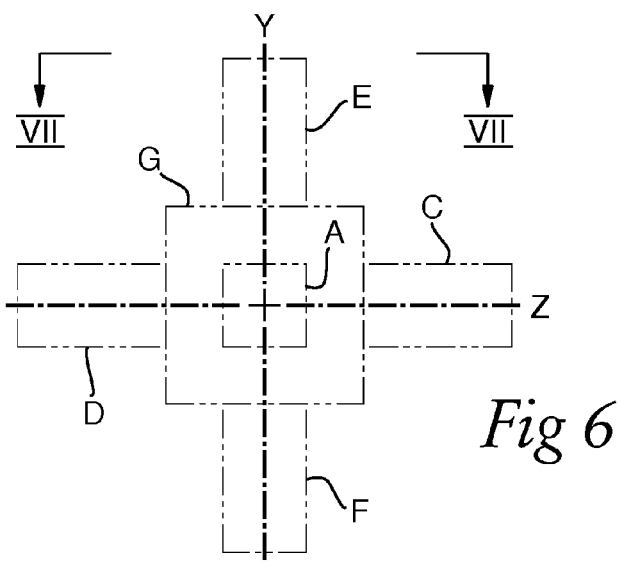
Figure 7:
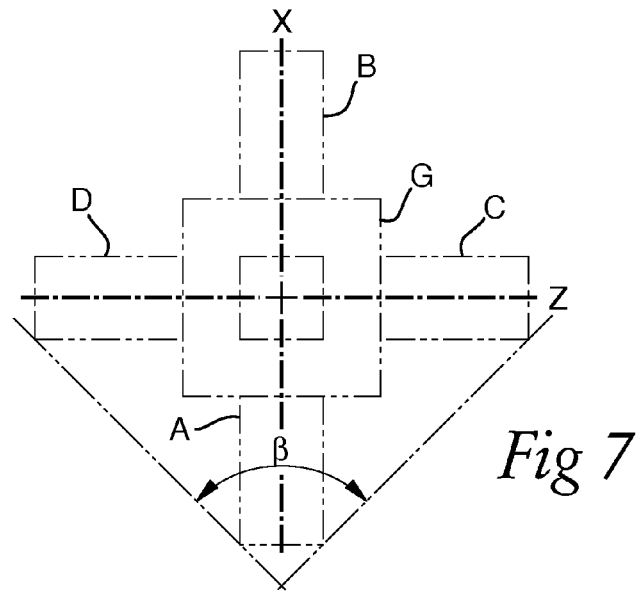
Figure 8:
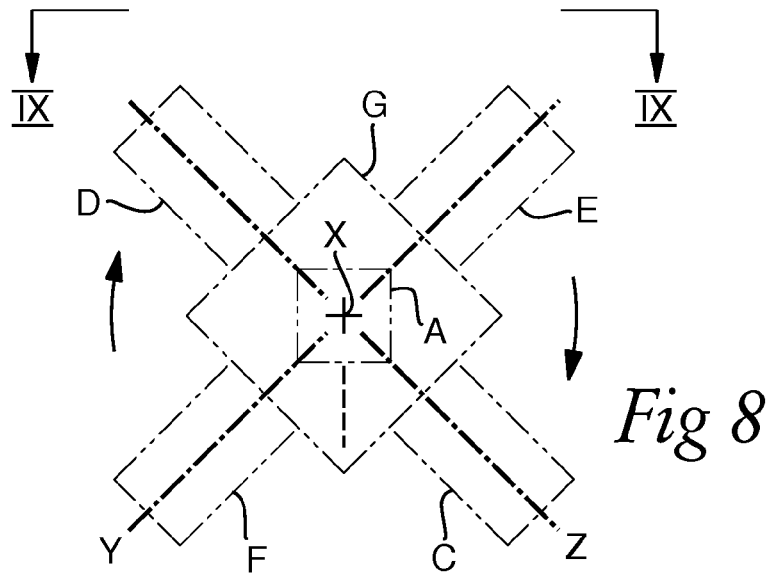
Figure 9:
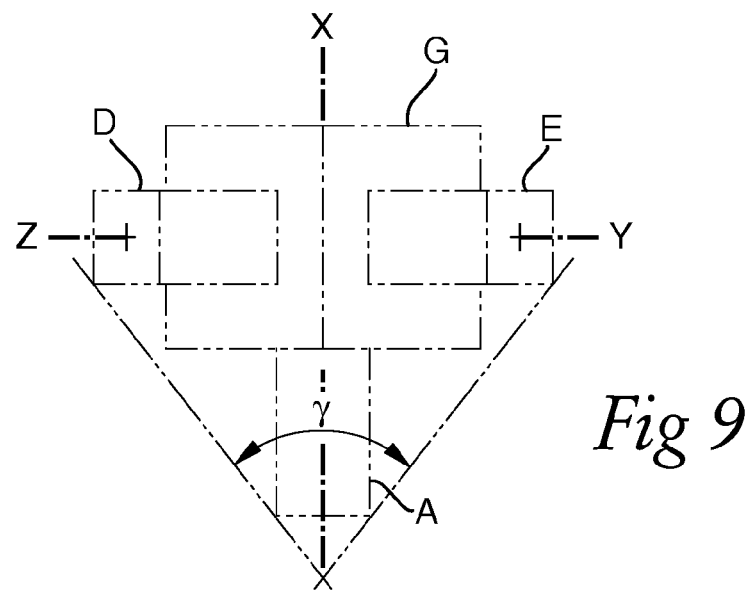
Figure 10:
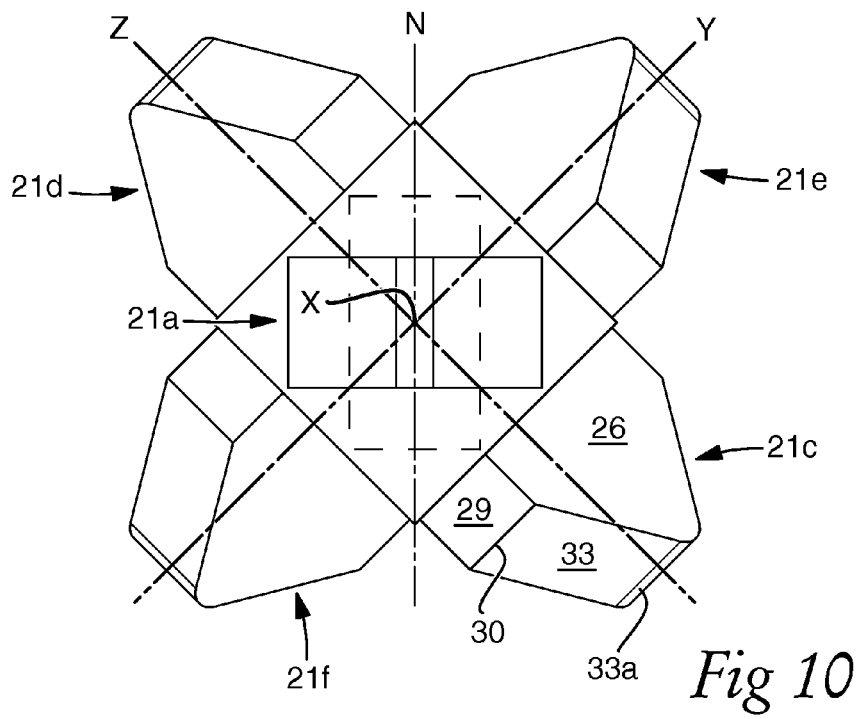
Figure 11:
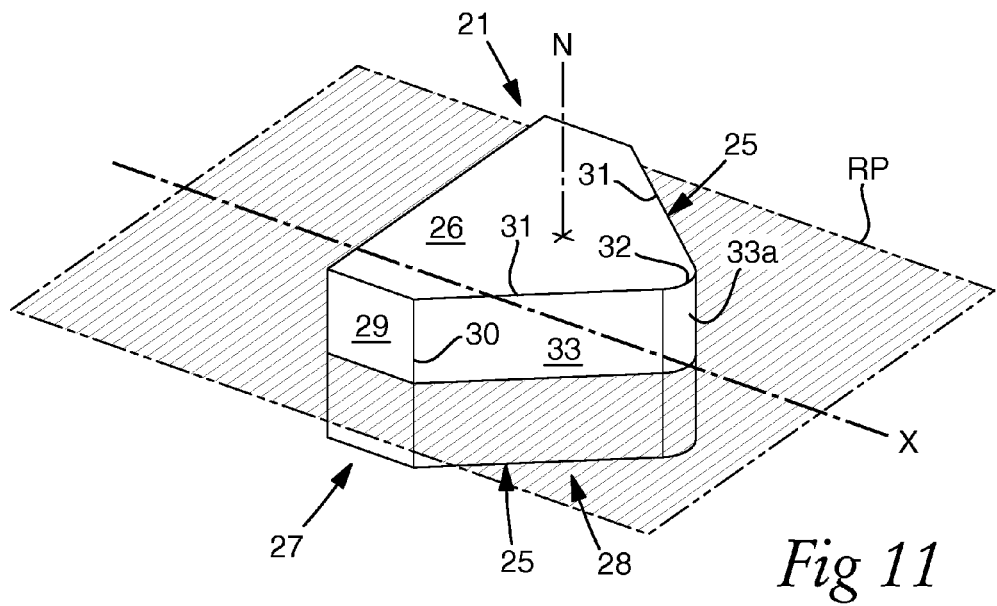
Figure 12:
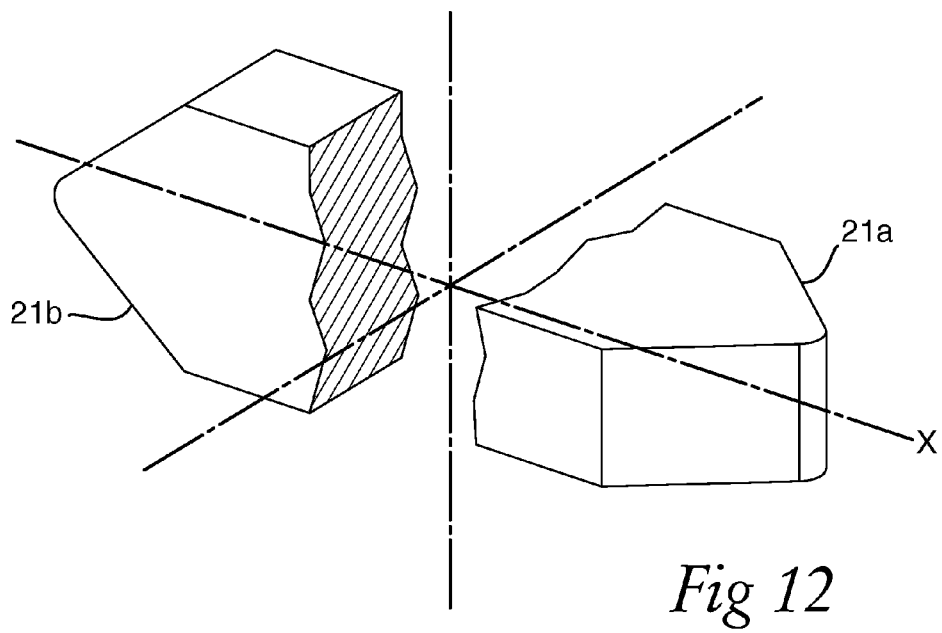
Figure 13:
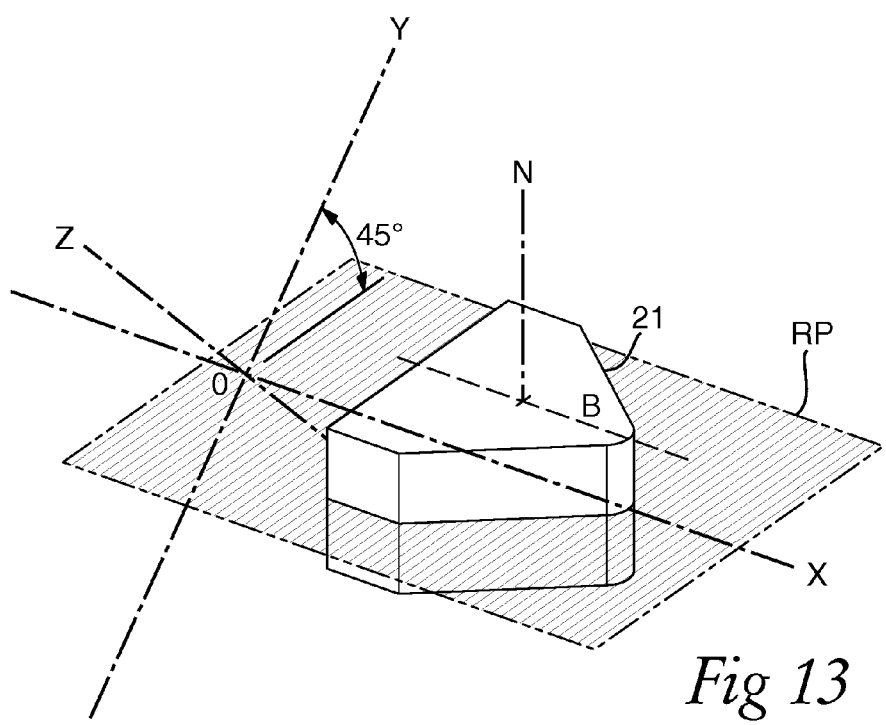
Figure 14:
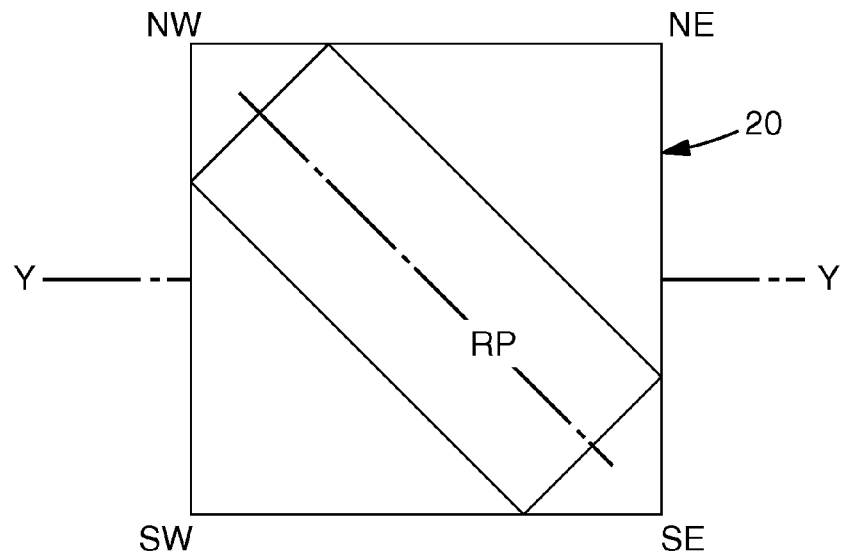
Figure 15:
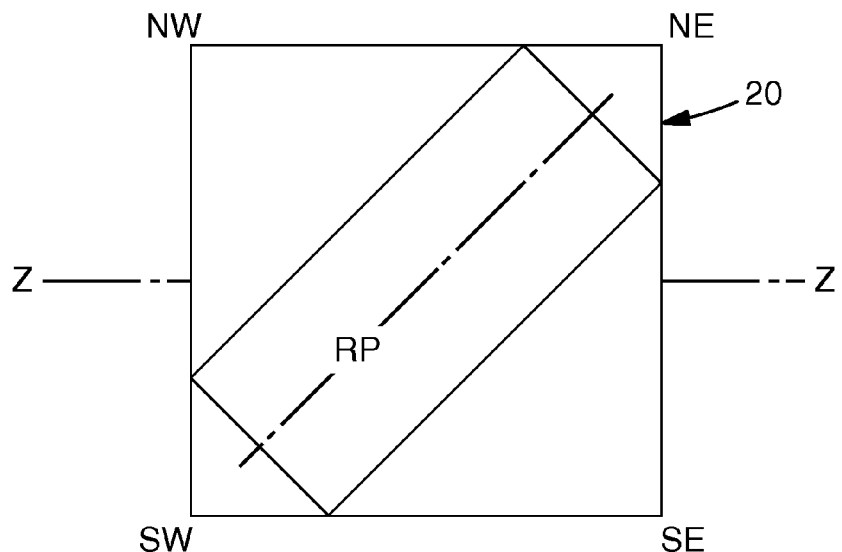
Figure 16:
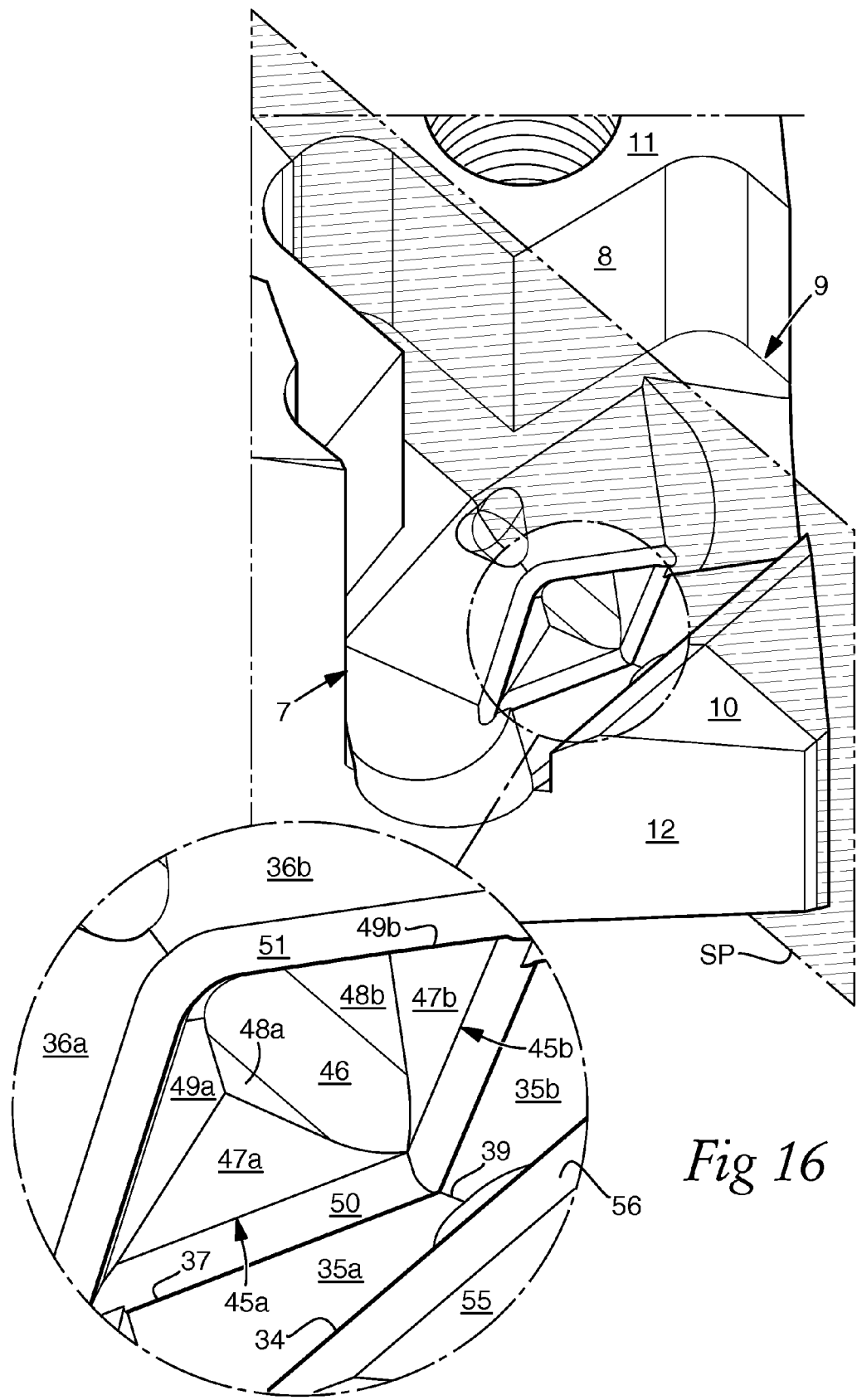
Figure 17:
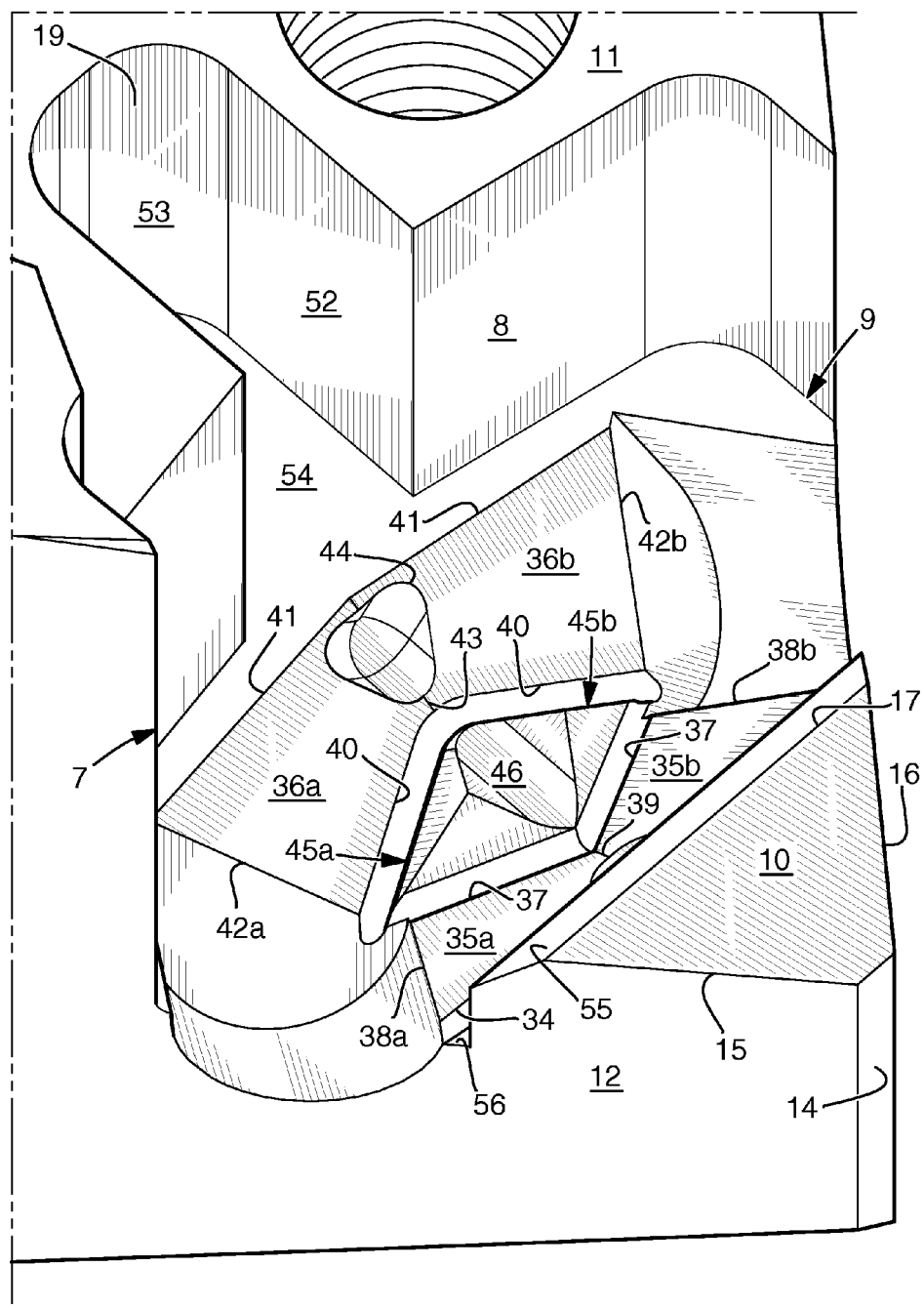
Figure 18:
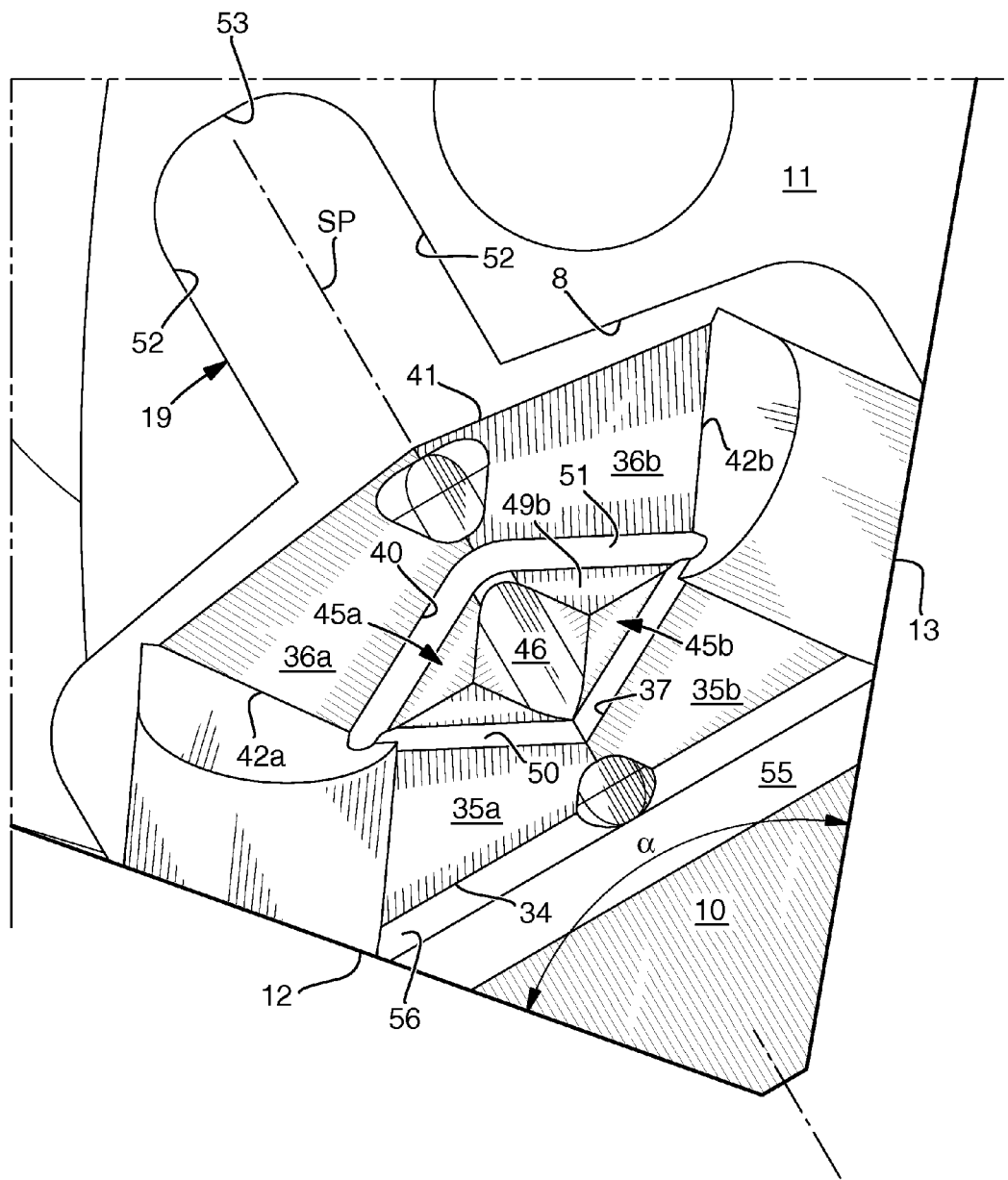
Figure 28:
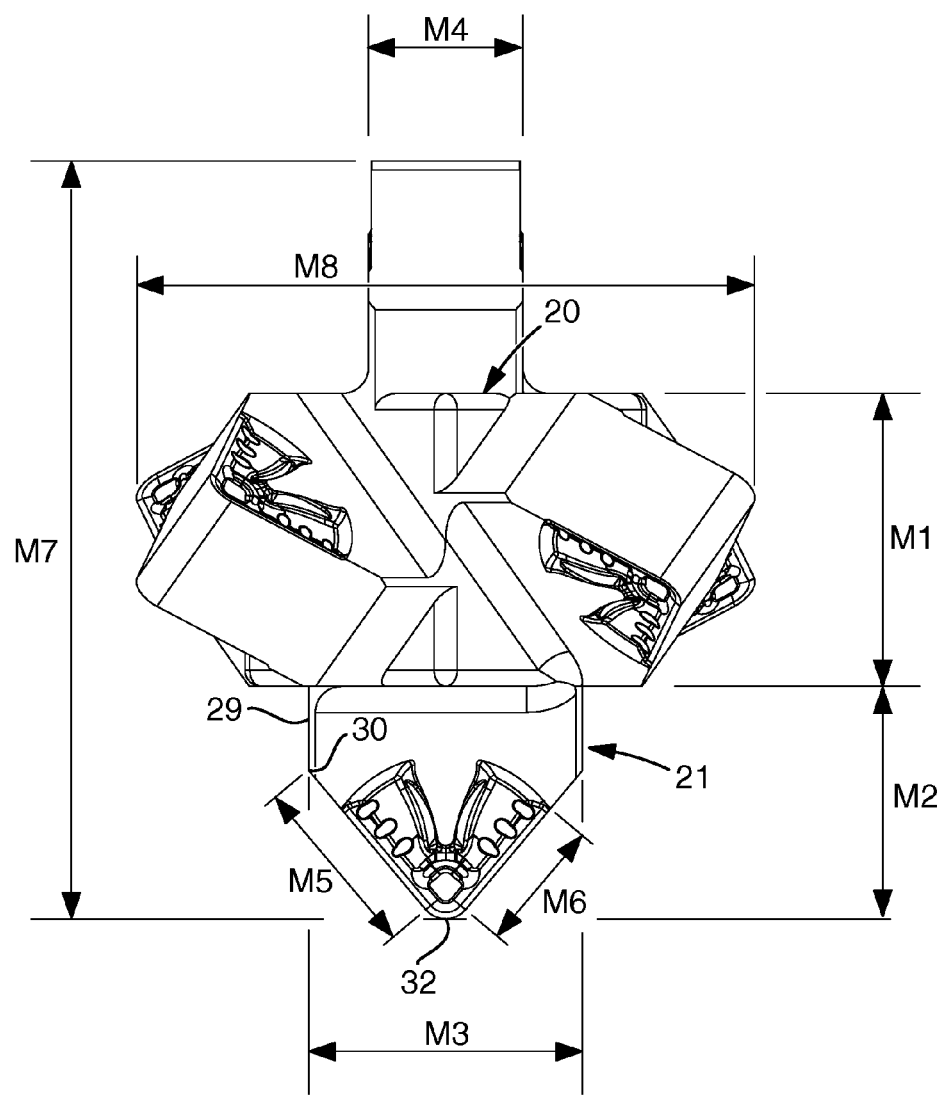

In the drawings:

FIG. 1 is a perspective view of a tool made in accordance with the invention, in the form of a turning tool in an assembled state, FIG. 2 is a perspective exploded view showing the different components of the tool in the form of a basic body, a cutting insert, a tightening device, and a screw, in a separated state, FIG. 3 is an enlarged perspective view of only the cutting insert, FIG. 4 is an enlarged, partial planar view of the bottom in a seat that is located in the tool basic body and receives the cutting insert, FIG. 5 is a virtual perspective view illustrating geometrical elements of the cutting insert according to the invention, FIG. 6 is a front view of the geometry figure according to FIG. 5, FIG. 7 is a planar view VII-VII in FIG. 6, FIG. 8 is a front view according to FIG. 6, although having four cutting tips rotated 45°, FIG. 9 is a planar view IX-IX in FIG. 8, FIG. 10 is a front view of the cutting insert, in which an imaginary, active cutting tip is regarded from the front, FIG. 11 is a bird's eye view of an individual, isolated cutting tip included in the cutting insert according to the invention, FIG. 12 is a schematic perspective view showing two diametrically opposed cutting tips along one and the same co-ordinate axis, FIG. 13 is a bird's eye view showing an isolated cutting tip and its spatial position in relation to the co-ordinate axes of four other cutting tips, FIGS. 14-15 are front views of a cubical core included in the cutting insert, as viewed from different directions, FIG. 16 is a bird's eye view of the seat that is formed in the basic body and in which the cutting insert is mounted, a symmetry plane being shown in the seat as well as an extremely enlarged segment of a portion of the bottom, FIG. 17 is a similar bird's eye view, but without symmetry plane, FIG. 18 is a planar view from above illustrating only the bottom of the seat, FIG. 19 is a further planar view of the bottom of the seat, illustrating the support surfaces that co-operate with contact surfaces of the cutting insert in one of three different indexing states, FIG. 20 is a planar view from above of a cutting insert as this is meant to be mounted in the seat according to FIG. 19, FIG. 21 is a planar view from below of the same cutting insert in a state overturned 180° forward, FIGS. 22-27 are planar views corresponding to FIGS. 22-24 and 25-27, respectively, although showing the cutting insert in two other indexing states, and FIG. 28 is a planar view with relevant measures of the cutting insert indicated.

DETAILED DESCRIPTION OF A PREFERRED EMBODIMENT OF THE INVENTION

In FIGS. 1-4, a tool made in accordance with the invention for chip removing or cutting machining is shown, more precisely in the form of a turning tool. The main components of the tool are a basic body 1 and a replaceable cutting insert 2. In addition, a tightening device 3 is included in the form of a clamp, which has the purpose of clamping the cutting insert in a seat in the basic body 1. This is achieved by means of a screw 4 having double threads. In a traditional way, the cutting insert 2 may be manufactured from cemented carbide, while the basic body 1 is manufactured from a steel billet, more precisely by cutting machining.

In the example, the basic body 1 is formed with a head 5 and a fixing part 6, by means of which the basic body can be fixed in an appurtenant machine. The seat in the basic body, which has the purpose of receiving the cutting insert 2, is generally designated 7 and is delimited by a wall 8 as well as a bottom that in its entirety is designated 9 and includes a plurality of support surfaces, which will be described in detail later. However, one of said support surfaces is a primary support surface or main support surface designated 10 and spaced apart from the wall 8. It should in addition be mentioned that the wall 8, along an upper boundary line, transforms into a plateau surface 11 situated on a higher level than the bottom 9.

The seat 7 is located in a tapering, nose-like portion of the head 5. This portion, which henceforth is denominated nose, is delimited by two side surfaces 12, 13 that converge toward a common corner 14. On these surfaces 12, 13, the main support surface 10 borders via boundary lines 15, 16, which, together with a rear, straight boundary line 17, impart a triangular basic shape to the surface. The angle of convergence of the nose between the surfaces 12, 13 is denominated nose angle. In FIG. 4, this angle is designated α. In the example, the same amounts to 80°, i.e., an acute angle that is considerably smaller than 90°. In FIG. 4, also a 90° corner angle between two meeting, imaginary surfaces in a workpiece is outlined by means of the dash-dotted lines 18 outside the nose part (clearance=5° on each side).

In the rear wall 8, a cavity 19 opens, the purpose of which is described later.

In FIG. 3, it is seen that the cutting insert 2 includes a central core 20 from which six equally long cutting tips 21 protrude. The features that characterize the real cutting insert according to the invention shown in FIG. 3 will be described in more detail below. However, it should already now be pointed out that the core 20 in the example has the shape of a cube, i.e., a geometrical body that includes six plane and quadratic surfaces, eight corners, as well as twelve straight edge lines that converge three by three in the individual corners. In order to mutually distinguish the different cutting tips, the designation 21 is supplemented by the suffixes a, b, c, d, e, and f.

In FIG. 2, N designates a normal to the main support surface 10. This normal is shown in a vertical position, and therefore the main support surface 10, in the perspective viewed, is horizontally oriented.

The main support surface 10 forms a fixed point of the geometry of the seat 7 in space, at the same time as the under side of the forwardly indexed, active cutting tip 21 of the cutting insert forms a fixed point of the geometry and position in space of the cutting insert.

In FIG. 3, it is seen that the number of cutting tips 21 included in the cutting insert amounts to six. In the example, each cutting tip is double-sided so far that the same includes two opposite and identical upper and under sides, between which a common clearance surface extends. The design of the individual cutting tip will be described later, reference being made to FIG. 11. In each cutting tip, traditional chip-formers 22 are present, which only are shown in the real embodiment according to FIGS. 3 and 28. These chip-formers 22 have an irregular topography that differs from the otherwise plane surfaces of the cutting tip. In addition, it should be pointed out that the cutting tips 21 transform into the cube 20 via concave radius transitions 23 that, like the chip-formers 22, only are shown in FIGS. 3 and 28.

In FIG. 3, it is furthermore seen that the cutting tips 21 are located in pairs along the co-ordinate axes of a three-dimensional, orthogonal system of co-ordinates. Thus, the two diametrically opposed cutting tips 21a, 21b are located along a common co-ordinate axis X. In an analogous way, the cutting tips 21c, 21d are located along the co-ordinate axis Z, as well as 21e, 21f along the co-ordinate axis Y.

Elementary Geometrical Summary of the General Idea of the Invention

In order to facilitate the understanding of the nature of the cutting insert, reference is now made to the virtual drawing FIGS. 5-9. In said figures, the real cutting tips 21 of the cutting insert are represented by fingers, A, B, C, D, E, and F, while a core is designated G. The fingers are shown with a long narrow, parallelepipedic shape having a quadratic cross-section, each individual finger being centrically placed along an appurtenant, quadratic surface on the cube G that represents the core of the cutting insert, and each one of the four boundary lines H of the individual finger running parallel to an outer edge line I on the cube.

The different fingers A-F are oriented along co-ordinate axes X, Y, Z in a system of co-ordinates of the same type as in FIG. 3. More precisely, the two diametrically opposed fingers A, B are oriented along the axis X, the fingers C and D along the axis Z, as well as the fingers E, F along the axis Y. The finger A, which represents an active cutting tip, is assumed to have the plane upper and under sides thereof situated horizontally in space. When the cutting insert is regarded in front view from the front according to FIG. 6, the fingers E, F are vertically oriented along the co-ordinate axis Y, at the same time as the two fingers C, D are horizontally oriented along the axis Z. When the virtual cutting insert is regarded in plane elevation from above according to FIG. 7, it is seen that an angle 6 between, on one hand, a free, outer end of the finger A, and, on the other hand, the outer ends of the two fingers C, D, which are situated in the same horizontal plane as the finger A, will amount to 90°, i.e., an angle that is not acute. This means that such a cutting insert cannot per se be installed in a nose in a tool for turning of a shoulder.

Suppose now that the fingers A and B along the co-ordinate axis X are held fixed in space at the same time as the cube G, as well as the appurtenant fingers C, D, E, and F, is rotated 45° around the axis X. Then the cutting insert will obtain the shape shown in FIG. 8, i.e., the upper and under sides of the fingers A, B are still situated in a horizontal plane, but the fingers D, E and C, F will point upward and downward, respectively, at an angle of 45° to the horizontal plane. When this virtual cutting insert is regarded in plane elevation from above according to FIG. 9, it is seen that the projected angle γ between the finger A and the obliquely upwardly (at an angle of 45°) pointing fingers D and E (as well as the two downwardly pointing fingers C, F) becomes smaller than 90°. More precisely, in the example, the angle γ amounts to approx. 77°, i.e., an angle that is considerably smaller than 90°.

Continued Detailed Description of the Real Embodiment of the Cutting Insert as Well as of the Basic Body of the Tool In FIG. 11, an individual cutting tip 21 is shown isolated from the cubical core 20 of the cutting insert. As co-ordinate axis of the same, the axis X has been selected.

In the embodiment of the cutting insert shown, the individual cutting tip is double-sided so far that the same includes two identical cutting edges 25 adjacent to two opposite upper and under sides in the form of identical surfaces 26, which are generally plane and mutually parallel. Note that the chipformers 22 and the radius transitions 23 according to FIG. 3 have been eliminated in FIG. 10 for the sake of clarity. In the cutting tip 21, there are included two parts or cemented carbide portions having different contour shape, viz. a rear part 27 and a front part 28, which in this case tapers toward a front tip. The upper side 26 (as well as the under side) is a plane surface that is common to the front and rear parts 27, 28. The rear part 27 has a parallelepipedic basic shape by being delimited by not only the two surfaces 26 forming upper and under sides, but also by two opposite side surfaces 29 that are plane and mutually parallel as well as form right angles with the surfaces 26. The rear part 27 transforms into the front 28 via boundary lines 30. Arbitrary vertical cross-sections through the rear part 27 have a quadrangular shape. More precisely, the cross-sectional shape is rectangular as a consequence of the width of the rear part in this case being greater than the thickness thereof (=the distance between the upper and under sides 26). The tapering shape of the front part 28 entails that the individual cutting edge 25 becomes V-shaped. Thus, the individual cutting edge 25 includes two (straight) main edges 31 that converge toward a common nose edge 32, more precisely at an angle of convergence that advantageously is approximately (but not necessarily exactly) equal to the nose angle α of the tool nose (see FIG. 4). In the example, the same amounts to 80°. The two cutting edges 25 are formed adjacent to a common clearance surface that includes two plane part surfaces 33, which converge in a convex nose surface 33a, the radius of which determines the radius of the nose edge 32. It should be evident that the two opposite surfaces 26 consist of identical chip surfaces that can be turned either upward or downward depending on the indexing state of the cutting insert.

In FIG. 11, RP designates a reference plane, which is parallel to at least the under side of the cutting tip, and with which the co-ordinate axis X coincides. In the example shown, wherein the cutting tip is double-sided, the reference plane RP is situated halfway between the upper and under sides 26 (or the chip surfaces), and forms, therefore, also a neutral plane of the cutting tip. It should also be mentioned that the co-ordinate axis X runs centrally between the front and rear ends of the cutting tip, and therefore the same forms a bisector of the nose angle that determines the V-shape of the cutting edges. Thus, if the nose angle is 80°, each main edge and each plane clearance face 33 will be tilted at 40° to the co-ordinate axis X.

In FIGS. 14 and 15, front views are shown of the cube 20 that forms the core of the cutting insert, FIG. 14 showing one of the four quadratic surfaces that are exposed forward (to the observer) if the cube is rotated in steps 90° around the co-ordinate axis Y. Correspondingly, FIG. 15 illustrates one of the four cube surfaces that are exposed if the cube is rotated around the co-ordinate axis Z. In both figures, the cardinal points designations NW, NE, SW and SE have been introduced. When the cube is rotated around the axis Y, all four cutting tips will be oriented with their reference planes RP in the direction NW-SE.

However, this is not the case if the cube is rotated around the co-ordinate axis Z. Namely, then every second cutting tip will be oriented in the direction SW-NE as shown in FIG. 15, while every second is oriented in the same way as in FIG. 14, i.e., in the direction NW-SE. However, in all cases, the reference planes RP of the cutting tips run between two diagonally opposite corners of the cube.

From the above, it is evident that the cutting insert is not spatially symmetrical. This means that the two downward/rearward-pointing cutting tips, which should be pressed against co-operating support surfaces in the bottom 7 of the seat, will be oriented with their contact surfaces in different ways in the space, all depending on the indexing state in question. In order to solve this problem, the bottom of the seat is formed with three sets of co-operating support surfaces. These will be described in more detail below, reference being made to FIGS. 16-18.

In FIG. 12, it is seen that the diametrically opposed cutting tips that are located along a common co-ordinate axis, e.g. the cutting tips 21a, 21b along the co-ordinate axis X, are rotated 90° in relation to each other. In FIG. 13, it is furthermore seen that the individual cutting tip along a first co-ordinate axis is rotated 45° in relation to the two other co-ordinate axes (cf. FIG. 8). This is illustrated by an extension of the reference or neutral plane RP of the cutting tip 21 situated along the co-ordinate axis X being intersected by the co-ordinate axes Y and Z at an angle of 45°.

In FIG. 13, it is further shown how a bisector B divides the nose angle into two equally large angles. In addition, the normal N (see FIG. 2) is drawn to mark that the active cutting tip always is pressed against the main support surface 10 in the bottom of the receiving seat.

Reference is now made to FIGS. 16-18, which illustrate the design of the seat 7 included in the basic body 1. In FIG. 16, SP designates a vertical symmetry plane that divides the seat, including the bottom thereof, into two mirror-symmetrical halves. In an area between the main support surface 10 and the wall 8, a plurality of secondary support surfaces (henceforth denominated "minor support surfaces") are present, which all are situated on a lower level than the main support surface 10. Of said minor support surfaces, two front 35a, 35b ones on each side of the symmetry plane SP, are situated closest to the main support surface 10, while two rear 36a, 36b ones are situated closest to the wall 8. The surfaces 35a, 35b are plane and extend between front and rear boundary lines 34, 37. Each individual surface 35a, 35b leans rearward/downward from the front boundary line 34 toward the rear 37 one, as well as mutually from outer boundary lines 38a, 38b toward a lower centre 39. Also the rear minor support surfaces 36a, 36b are plane and extend between front and rear, respectively, boundary lines 40, 41. Likewise, the surfaces 36a, 36b lean on one hand in the direction obliquely downward/forward, and on the other hand inward from outer boundary lines 42a, 42b toward a lower centre 43. Between the surfaces 36a, 36b, there is a first, central countersink 44.

In the area between the pairs of front and rear minor support surfaces 35a/35b and 36a/36b, there are two pyramidal knobs 45a, 45b on both sides of a second, central countersink 46. As is seen by the enlarged segment in FIG. 16, each such knob 45a, 45b includes three flank surfaces 47a, 48a, 49a and 47b, 48b, 49b, respectively, (the last-mentioned one of which is visible only in FIG. 18). As will be seen in FIGS. 19-27, two of the three flank surfaces of each knob, viz. the flank surfaces 47a, 49a and 47b, 49b, can co-operate with the adjacent minor support surfaces 35a, 36a and 35b, 36b, respectively, with the purpose of supporting two downward/rearward-pointing cutting tips of the cutting insert, more precisely in combinations that are determined by the indexing states in question of the cutting insert. In other words, also the flank surfaces 47a, 47b and 49a, 49b serve as minor support surfaces in co-operation with the minor support surfaces 35a, 35b and 36a, 36b. Thus, the surface pair 35a, 47a forms a first, cross-sectionally V-shaped chute and the surface pair 35b, 47b a second such chute. In an analogous way, the surface pairs 36a, 49a and 36b, 49b form two rear V-chutes.

The two knobs 45a, 45b are separated from the front and rear minor support surfaces 35a/35b and 36a/36b via concave radius transitions 50, 51 (see FIG. 16), which, as viewed from above, individually have a V-like contour shape.

Concerning the seat 7 in other respects, it should be pointed out that the rear cavity 19 in this case opens not only in the wall 8, but also upward in the plateau surface 11. The cavity is delimited by two plane and parallel side surfaces 52, as well as a concave end surface 53, which extend upward from a floor surface 54. This floor surface 54 is plane and situated on a lower level than the main support surface 10. It should be evident that the symmetry plane SP is situated halfway between the side surfaces 52 of the cavity at the same time as the same forms a right angle with the main support surface 10 as well as the floor surface 54. In addition, the width of the cavity 19 (between the side surfaces 52) is greater than the thickness of the individual cutting tip 21 such as this is determined by the distance between the upper and under sides of the cutting tip. This means that the cutting tip, which is diametrically opposite the active one (and rotated 90° to the same), is contained in the cavity 19 without being in contact with the limiting surfaces thereof. As is further seen in FIG. 17, the main support surface 10 transforms, via the boundary line 17, into a downward/rearward-leaning slope surface 55, which in turn is separated from the front minor support surfaces 35a, 35b via a groove 56.

Because the number of cutting tips of the cutting insert amounts to six and each cutting tip is double-sided, i.e., includes two chip surfaces that can be turned either upward or downward, the number of possible indexing state becomes 2×6=12. In other words, no less than twelve fresh cutting edges can effectively be utilized for chip removal.

As previously mentioned, the cutting insert is spatially unsymmetrical so far that all four cutting tips, in one of two planes perpendicular to each other, are oriented in one and the same direction (NW-SE in FIG. 14), while two pairs of cutting tips in the other plane are oriented in different ways, viz. two cutting tips in the direction NE-SW (see FIG. 15) and two ones in the direction NW-SE. The consequence of this asymmetry is that different combinations of minor support surfaces in the seat will effectively support different contact surfaces (surface fields) of the cutting tips; all depending on the indexing state in question. This is seen in FIGS. 19-27.

In FIG. 19, the bottom of the seat is shown in plane elevation from above, while FIG. 20 shows the upper side of a cutting insert that is assumed to be mounted in the seat. In this case, the cutting tip 21a is assumed to be active and the diametrically opposed cutting tip 21b along the same co-ordinate axis (X) located in the cavity 19. In this position, two cutting tips 21c, 21f point downward from the core 20 of the cutting insert so as to abut against the combination of support surfaces that includes the screened surface fields in FIG. 19.

In FIG. 21, which shows the cutting insert in an upside-down state, it is illustrated which surface fields of the downwardly facing cutting tips 21c, 21f that are in contact with the support surfaces in the seat. Primarily, the under side of the cutting tip 21a is in contact with the main support surface 10. Furthermore, the surface fields F1, F2 of the cutting tip 21f are in contact with the rear minor support surface 36a and the flank surface 49a of the knob 45a. The surfaces 36a and 49a are oriented at 90° to each other and form a cross-sectionally V-shaped chute, in which the edge portion of the cutting tip 21f can be received, wherein the surface fields F1, F2 perpendicular to each other can be pressed against the surfaces 36a, 49a.

The two surface fields F3 and F4 of the other cutting tip 21c pointing downward are pressed in an analogous way against the front minor support surface 35b as well as against the flank surface 47b of the knob 45b. Also the last-mentioned pair of surfaces forms a cross-sectionally V-shaped chute, in which an edge portion of the cutting tip 21c can be received.

When the cutting insert is mounted in the seat, the main support surface will carry the tangential cutting forces that act against the cutting insert, while the pairs of surfaces 36a/49a and 35b/47b will, in combination with each other, carry the axial and radial cutting forces. Primarily, the surfaces 36a and 47b carry radial forces, while the same surfaces in co-operation with the surfaces 49a and 35b primarily carry axial forces.

Reference is now made to FIGS. 22-24, which illustrate the cutting insert in another indexing state. In this case, the cutting tip 21c has been indexed forward as an active cutting tip and abuts with its under side against the main support surface 10 of the seat. In this state, the two cutting tips 21b, 21f face downward so as to rest against suitable support surfaces in the bottom of the seat. More precisely, the cutting tip 21f is supported with two surface fields F5, F6 against the front minor support surface 35a and the flank surface 47a of the knob 45a, respectively. Analogous surface fields F7, F8 of the other, downwardly pointing cutting tip 21b are simultaneously pressed against the minor support surface 35b as well as against the flank surface 47b of the knob 45b.

In the same way as previously, the main support surface 10 carries axial forces, while the radial and axial forces are carried by a combination of the pairs of minor support surfaces 47a/35a and 47b/35b.

Finally, in FIGS. 25-27, a third indexing state is illustrated, in which the cutting tip 21e is active, the two cutting tips 21b, 21c pointing downward to be supported by co-operating support surfaces. As seen in FIG. 27, said cutting tips are pressed against the front and rear minor support surfaces 35a, 36b as well as against the flank surfaces 47a and 49a of the knobs 45a and 45b, respectively. More precisely, the surface field F9 of the cutting tip 21c is pressed against the surface 35a and the surface field F10 against the flank surface 47a. Simultaneously, the surface fields F11 and F12 of the cutting tip 21b are pressed against the rear minor support surface 36b and the flank surface 49b of the knob 45b, respectively. The radial forces are primarily carried by the surfaces 47a and 36b, while the axial forces are carried by the surfaces 35a, 49b. The combination of support surfaces according to FIG. 25 can be said to be a mirror image of the combination according to FIG. 19.

In FIGS. 19-21, one of four similar indexing states is shown, in which either the cutting tip 21a or the cutting tip 21b is pressed with one of the chip surfaces against the main support surface 10. In all four cases, the contact surfaces of the two downwardly pointing cutting tips will be supported in the two V-chutes that are delimited by the surface pairs 36a/49a and 35b/47b (see FIG. 19). In an analogous way, each one of the support combinations according to FIGS. 22 and 25 can be applied to four different indexing states.

Reference is now made again to FIG. 2, which shows how the plateau surface 11 is surrounded by a border, in its entirety designated 57, which has a generally arched contour shape. More precisely, the border includes two sections of different arc radii, viz. a rear section 58 having a smallest radius of curvature, and a border section 59 running forward from the same and having a greater radius. The border transforms via a curved, upper boundary line into a second plateau surface 60, which is situated on a higher level than the first plateau surface 11, and which, like the same, is delimited by an arched border 61.

A hole designated 63 having a female thread is placed near the rear wall 8 of the seat 7, more precisely beside the cavity 19. A centre axis of the hole 63 is designated C and runs parallel to the normal N toward the main support surface 10. In the clamped state of the cutting insert, the centre axis C coincides with the centre axis of the screw 4 as well as the centre axis of a through hole 64 through the clamp 3. Like the hole 63, said hole 64 includes a female thread (not visible).

As previously mentioned, the screw 4 includes two threads 65, 66, one of which is left-hand running and the other one right-hand running. Of these, the lower thread 65 is in engagement with the female thread in the hole 63, while the upper one 66 is in engagement with the female thread in the hole 64. The screw 4 is rotatable by means of a key (not shown) that can be applied in a key grip 67 in the upper end of the screw.

In the lower edge of the front part of the clamp 3, a V-shaped notch 68 is formed, the two limiting surfaces of which form approximately an angle of 90° to each other. When the clamp, by tightening of the screw, is clamped against the cutting insert, as shown in FIG. 1, the notch 68 is located against an upwardly facing, tappet-like edge portion of the cubical core 20.

Thanks to the double threads of the screw 4, the clamp 3 can be clamped and detached, respectively, with large speed (double speed in comparison with a single thread). Thus, in a prototype based on the invention, the move of the clamp between its clamping position to a released, raised position can be effected by rotation of the screw approx. 1.5 revolutions. In its raised position, the clamp may—in connection with insert replacements—be turned in with its rear part above the second plateau surface 60, and there readily be wedged against the border 61. In this position, the clamp 3 is accordingly held turned-out sideward under exposure of the support surfaces of the seat bottom. When an insert replacement has been effected, the clamp is again turned in and brought with its rear part down toward the plateau surface 11. In doing so, the clamp is guided by the border 57, the contour shape of which corresponds to the contour shape of the clamp on the side in question. In other words, during its movement to its lowest position, the clamp will be guided by the border in such a way that the V-notch 68 reliably is pressed against the edge portion in question of the cubical core 20 of the cutting insert.

In FIG. 28, a concrete embodiment is shown of a cutting insert according to the invention, more precisely a prototype, the dimensions of which are seen below:

M1=the edge length or thickness of the cube 20,
M2=the length of the individual cutting tip 21, such as this is regarded between the outer nose edge 32 of the cutting tip and the cube 20,
M3=the width of the individual cutting tip 21 between the side surfaces 29 (see also FIG. 11),
M4=the thickness of the individual cutting tip as viewed between the upper and under sides thereof,
M5=the edge length of the individual cutting tip from the boundary line 30 to the outer tip (the nose edge excluded),
M6=the corresponding edge length along only the part of the cutting tip that includes chip-formers (said edge length determines the maximal cutting depth of the cutting edge in the workpiece),
M7=the distance between the outer portions (the nose edges) of two diametrically opposed cutting tips along a common co-ordinate axis, and
M8=the projected distance between two opposite, downward- (or upward-) pointing cutting tips as viewed in plane elevation from above.

In the prototype example:
M1=9.00 mm
M2=7.14 mm
M3=8.40 mm
M4=4.73 mm
M5=4.04 mm
M6=2.90 mm
M7=23.20 mm
M8=19.00 mm It should be particularly noted that M8 amounts to only 82% of M7 (19.00 mm and 23.20 mm, respectively). This means (cf. FIG. 9) that the two obliquely downward- as well as the obliquely upward-pointing cutting tips by a comfortable margin are contained within a corner angle smaller than 90° (in the example approx. 83°) In other words, no one of the inactive cutting tips will protrude from the outside of the basic body so far that the same contact the surfaces in a corner to be machined.

A fundamental advantage of the cutting insert according to the invention (and the appurtenant tools) is that the same can be manufactured with a large number of alternately usable cutting edges, without the cutting insert requiring too large an installation space in a tool basic body. Thus, the cutting insert can be formed with no less than twelve cutting edges (six if the cutting tips are made single sided) without because of this making impossible that the same is housed in, for instance, an acute-angled nose. In addition to allowing installation of cutting inserts in such turning tools that include tapering noses, the cutting insert can also be housed in milling cutter heads for the milling of corners having a maximum corner angle of 90°.

Another advantage of the cutting insert and the tool according to the invention is based on the fact that cemented carbide has a considerably greater thermal conductivity than steel, more precisely approx. 3 times greater. Thus, cemented carbide has a coefficient of thermal conductivity $\lambda$ of approx. 120 W/(m×C.°), while the corresponding coefficient of steel is just above 40. In the cutting zone, i.e., the delimited spot along the cutting edge where the chips are removed from the workpiece, considerable amounts of heat are generated, which may damage the cutting edge and shorten the service life of the cutting insert. By its lower thermal conductivity, steel forms an insulating barrier, which counteracts quick heat dissipation. Therefore, the greater the surface along the cutting insert being in contact with steel, the inferior the heat dissipation becomes. If a cutting insert, for instance, is held by a clamp pressed against the upper side, at the same time as side surfaces of the same are in contact with side support surfaces in the seat, the total contact surface between the cutting inserts will be large and the heat dissipation mediocre.

In comparison with previously known cutting inserts, the heat dissipation from the cutting insert according to the invention is accelerated to a considerable extent. Thus, the active cutting tip is pressed against only one steel surface, viz. the main support surface. Simultaneously, the fairly voluminous—in comparison with the individual cutting tip—core forms a heat sink as a consequence of the large amount of cemented carbide material in the same. The core quickly discharges heat from the active cutting tip. What is more, with the exception of the diminutive Y-notch in the clamp, the core lacks contact with any steel surfaces. Thus, the necessary support of the cutting insert is guaranteed by the minor support surfaces in the seat bottom that are in contact with the two downwardly directed cutting tips, the contact surfaces of which against the cutting tips are moderate. Already when the evacuated heat reaches up to the last-mentioned ones, the temperature of the cutting insert has been reduced considerably, more precisely as a consequence of convection loss from the freely exposed side surfaces of the core.

Feasible Modifications of the Invention

The invention is not limited only to the embodiment described above and shown in the drawings. Thus, to the different cutting tips of the cutting insert do not necessarily need to have a flattened or cross-sectionally rectangular shape. For instance, the same may have a quadratic (or in another way polygonal) cross-sectional shape in the way indicated in FIGS. 5-9. Neither does the outer part of the individual cutting tip need to taper to form V-shaped cutting edges. If the cutting insert is formed, for instance, for milling purposes, the same may accordingly be formed with a chip removing main edge arbitrarily angled in relation to the co-ordinate axis of the cutting tip, as well as with a so-called wiper edge for surface-wiping purposes. Neither does the cutting tip need to include the particular inner part described above in that a triangular tip may be connected with its base directly against the cube or core. It should also be pointed out that the core does not necessarily need to be a cube. It is even possible to let the six cutting tips directly converge in a central material portion, the shape of which is determined by the surfaces of the cutting tips that meet each other in the centre of the cutting insert. In addition, it should be pointed out that cooling ducts may be built-in in the clamp in order to cool the active cutting tip.

The invention claimed is:

1. An indexable cutting insert for a chip removing machining, comprising:
a plurality of cutting tips that protrude from a central core, each of the plurality of cutting tips including a cutting edge, which is formed in a transition between an upper side serving as a chip surface and a clearance surface, which extends between the upper side and an underside, wherein six equally long cutting tips are located in pairs along co-ordinate axes of a three-dimensional, orthogonal system of co-ordinates, an origin of which is situated in said core, wherein a position of an individual cutting tip in relation to a position of the other cutting tips is defined by a reference plane that is parallel to the underside and with which a co-ordinate axis of the cutting tip coincides.

2. The cutting insert according to claim 1, wherein first and second, diametrically opposed cutting tips are disposed along a common, first co-ordinate axis and oriented with their respective reference planes perpendicular to each other, the two other co-ordinate axes intersecting an imaginary extension of the reference plane of the individual, first or second cutting tip at an angle of 45°.

3. The cutting insert according to claim 1, wherein the individual cutting tip comprises an outer part, in which the cutting edge is included, and an inner part that is positioned closest to the core and has a quadrangular cross-sectional shape.

4. The cutting insert according to claim 1, wherein the cutting edge is V-shaped and formed by two main edges that converge toward a common nose edge at an acute angle of convergence.

5. The cutting insert according to claim 1, wherein each of the plurality of cutting tips is double-sided such that the upper and under sides have identical chip surfaces that individually transform into a common clearance surface via a cutting edge.

6. The cutting insert according to claim 3, wherein the inner part of each of the plurality of cutting tips has a rectangular cross-sectional shape.

7. The cutting insert according to claim 1, wherein the core is cubical and includes six quadratic limiting surfaces from which the plurality of cutting tips protrude.

8. The cutting insert according to claim 7, wherein the individual cutting tip is located with its reference plane running between two diagonally opposite corners along the individual limiting surface of the cube.

9. A tool for a chip removing machining, comprising:
a basic body having a seat situated in an area between two surfaces of the basic body, the surfaces converging toward each other and delimited by a wall and a bottom;
an indexable cutting insert including a plurality of cutting tips protruding from a central core, each of the plurality of cutting tips including a cutting edge, which is formed in a transition between an upper side serving as chip surface, and a clearance surface, which extends between the upper side and an under side;
a tightening device arranged to press contact surfaces of the cutting insert against support surfaces in the bottom of the seat wherein, the cutting insert includes six equally long cutting tips located in pairs along co-ordinate axes of a three-dimensional, orthogonal system of co-ordinates, an origin of which is situated in the core of the cutting insert, a position of an individual cutting tip in relation to a position of the other cutting tips being defined by a reference plane that is parallel to the underside and with which a co-ordinate axis coincides; and
an active cutting tip located along a first co-ordinate axis of the cutting insert and pressed with an under side against a main support surface located in the bottom of the seat and spaced apart from the wall of the seat, a pair of cutting tips located along the two other co-ordinate axes being pressed with contact surfaces against secondary support surfaces situated between the wall and the main support surface and on a level below the main support surface.

10. A tool according to claim 9, wherein an inactive cutting tip, which is located diametrically opposite the active cutting tip and along the same co-ordinate axis, is housed in a cavity that opens in the wall of the seat.

11. A tool according to claim 9, wherein first and second, diametrically opposed cutting tips are located along a common, first co-ordinate axis of the cutting insert and are oriented with their reference planes perpendicular to each other, wherein the two other co-ordinate axes intersect an imaginary extension of the reference plane of the individual, first or second cutting tip at an angle of 45°.

12. A tool according to claim 11, wherein each of the plurality of cutting tips of the cutting insert include an outer part, in which the cutting edge is located and an inner part that is positioned closest to the core and has a quadrangular cross-sectional shape.

13. A tool according to claim 9, wherein the cutting edge of the cutting insert is V-shaped and formed by two main edges that converge toward a common nose edge at an acute angle of convergence.

14. A tool according claim 9, wherein each of the plurality of cutting tips of the cutting insert is double-sided such that the upper and under sides have identical chip surfaces, which via cutting edges transform into a common clearance surface.

15. A tool according to claim 12, wherein the inner part of each of the plurality of cutting tips of the cutting insert has a rectangular cross-sectional shape.

16. A tool according to claim 9, wherein the core of the cutting insert is cubical and includes six quadratic limiting surfaces from which the plurality of cutting tips protrude.

17. A tool according to claim 16, wherein the reference plane of each of the plurality of cutting tips runs between two diagonally opposite corners along a respective limiting surface.

18. A tool according to claim 9, wherein the tightening device is pressed against the core of the cutting insert.

\* \* \* \* \*